United States Patent
Bitar et al.

(10) Patent No.: US 9,686,810 B2
(45) Date of Patent: Jun. 20, 2017

(54) ESTABLISHING NETWORK CONNECTIVITY FOR TRANSMITTING NETWORK TRAFFIC TO OR FROM MACHINE DEVICES

(71) Applicant: Verizon Patent and Licensing Inc., Arlington, VA (US)

(72) Inventors: Nabil N. Bitar, Acton, MA (US); Kumar K. Vishwanathan, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 135 days.

(21) Appl. No.: 14/698,499

(22) Filed: Apr. 28, 2015

(65) Prior Publication Data
US 2016/0262190 A1 Sep. 8, 2016

Related U.S. Application Data

(60) Provisional application No. 62/127,067, filed on Mar. 2, 2015, provisional application No. 62/134,068, filed on Mar. 17, 2015.

(51) Int. Cl.
H04W 76/02 (2009.01)

(52) U.S. Cl.
CPC .............................. H04W 76/022 (2013.01)

(58) Field of Classification Search
None
See application file for complete search history.

(56) References Cited

U.S. PATENT DOCUMENTS 9,049,588 B2 * 6/2015 Choi ..................... H04W 8/245
2015/0148086 A1 * 5/2015 Aghili ................. H04L 12/5895
455/466
2016/0219605 A1 * 7/2016 Karlsson ............... H04W 72/06

* cited by examiner

Primary Examiner — Chi H Pham
Assistant Examiner — Shick Hom

(57) ABSTRACT

A machine management system provides a system and method for communicating user data with a device connected to a network. The device may register for service by the network, causing the machine management system to establish a special communications path through the network when it is determined that the device is a machine device. Thereafter, user data transmitted by the machine device (or transmitted to the machine device) may be communicated using the special communications path. In certain embodiments, the special communications path may be established such that existing network elements are not involved in the transmission of communications with the machine devices, thereby minimizing the impact on implementing the system and method on existing network elements, alleviating the burden of serving these machine devices using existing network elements and permitting the implementation of device-specific services for machine devices.

20 Claims, 14 Drawing Sheets

ESTABLISHING NETWORK CONNECTIVITY FOR TRANSMITTING NETWORK TRAFFIC TO OR FROM MACHINE DEVICES

CROSS-REFERENCE TO RELATED APPLICATIONS

This application claims priority to U.S. provisional patent application 62/127,067, filed Mar. 2, 2015, the entire contents of which are incorporated herein by reference. This application also claims priority to U.S. provisional patent application 62/134,068, filed Mar. 17, 2015, the entire contents of which are incorporated herein by reference.

BACKGROUND

The quantity of devices and the quantity of device types capable of communicating using a network is increasing. For example, in addition to "traditional" devices such as general purpose computing devices (e.g., personal computers, tablets, smartphones), devices with more specialized functionality and intended uses are now being configured for network access. This increase in devices seeking connectivity impacts the operation of networks, requiring additional access media, network elements and/or management activities, each with an associated cost to the network provider. Networks that include wireless access networks are particularly impacted due to the relatively limited effective bandwidth of wireless transmission media and the complexity of the network architecture needed to enable the benefits of wireless connections.

DETAILED DESCRIPTION OF PREFERRED EMBODIMENTS

The following detailed description of example implementations refers to the accompanying drawings. The same reference numbers in different drawings may identify the same or similar elements.

Networks have traditionally been implemented with functionality to allow connections with a variety of devices that include connectivity capabilities. For example, networks have been implemented to provide wireless access to devices having radio frequency (RF) communication capabilities, allowing these wireless devices to connect to the network at geographically diverse locations, send and receive communications (sometimes referred to as "messages" or "traffic") at any time, and move within the geographic area of the network without loss of connectivity. However, some types of devices may not require all of the functionality provided by a network. For example, some devices are relatively stationary, and rarely require mobility functions provided by a network. Some devices may only communicate sporadically—for example, on a periodic basis (e.g., once a day), in small quantities, as short bursts, in time/delivery-insensitive messages, or on command—and therefore do not need "always on" network connectivity. Example implementations described herein assist in managing such devices on a network and communicating information to and/or from such devices in a manner that reduces the costs associated with providing communications service to such devices over the network while sharing the same network infrastructure used to provide communications services to other devices over the network.

As used herein, the phrase "machine device" will be used to refer to devices that are characterized as having special connectivity requirements/capabilities that allow it to benefit from specialized handling from the network. This characterization may be done by manual designation (e.g., a user or network operator specifically designates the device as being a "machine device") or automatically through a detection process (e.g., by a specific indicator, by an address coding schema, by network usage characterization), such that it is beneficial for the device to be treated according to specialized network connectivity available as described herein. Some examples of devices that may qualify as "machine devices" under either of these characterization options could be sensor devices (e.g., cameras, microphones, thermometers, gyroscopes, pressure sensors, accelerometers), actuator devices (e.g., switches, valves, motors), or devices that include combinations of these (e.g., home appliances, vending machines, tracking devices, parking meters, etc.).

Figure 1A:
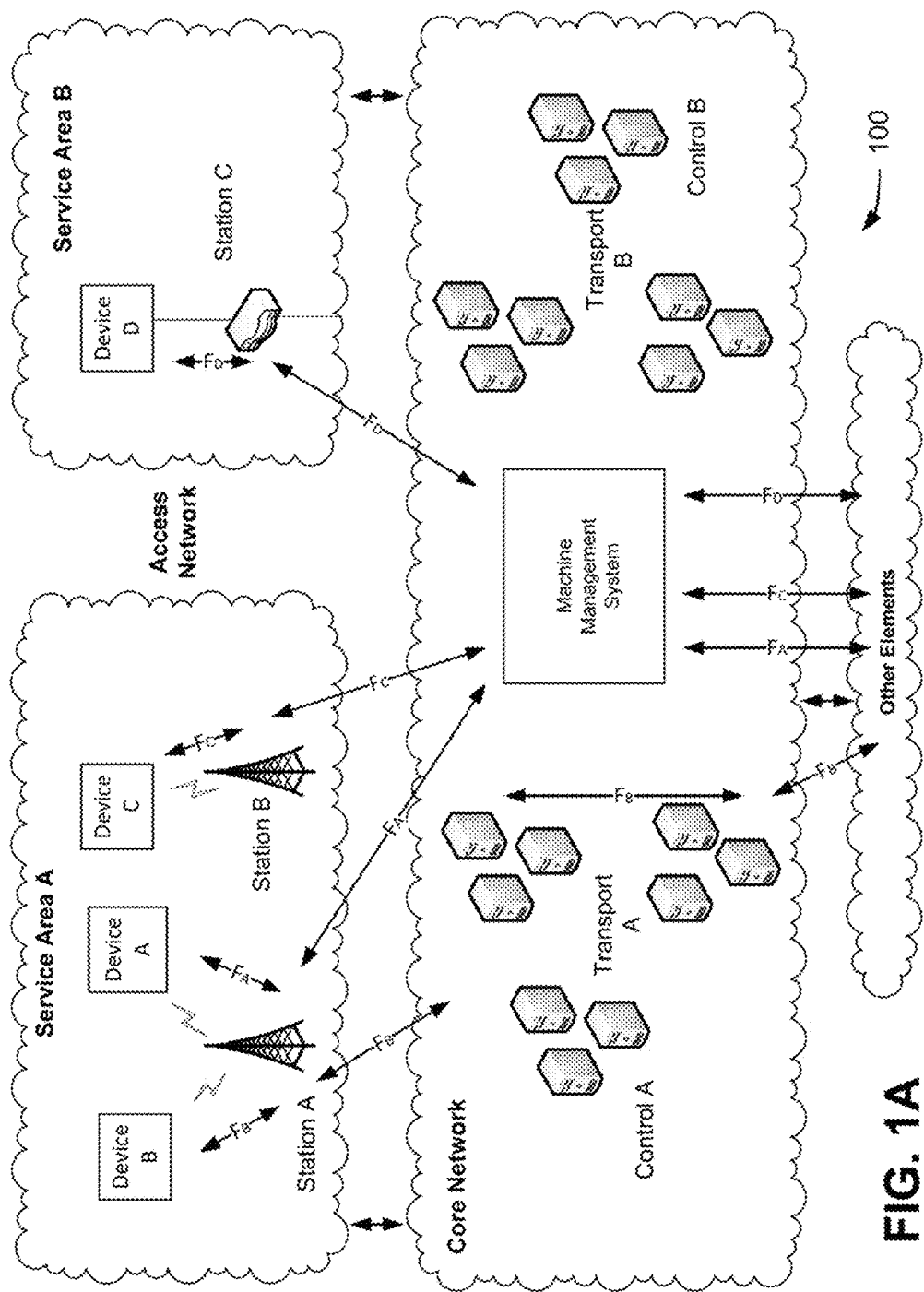
FIGS. 1A and 1B are diagrams of an overview of an example implementation described herein.
Figure 1B:
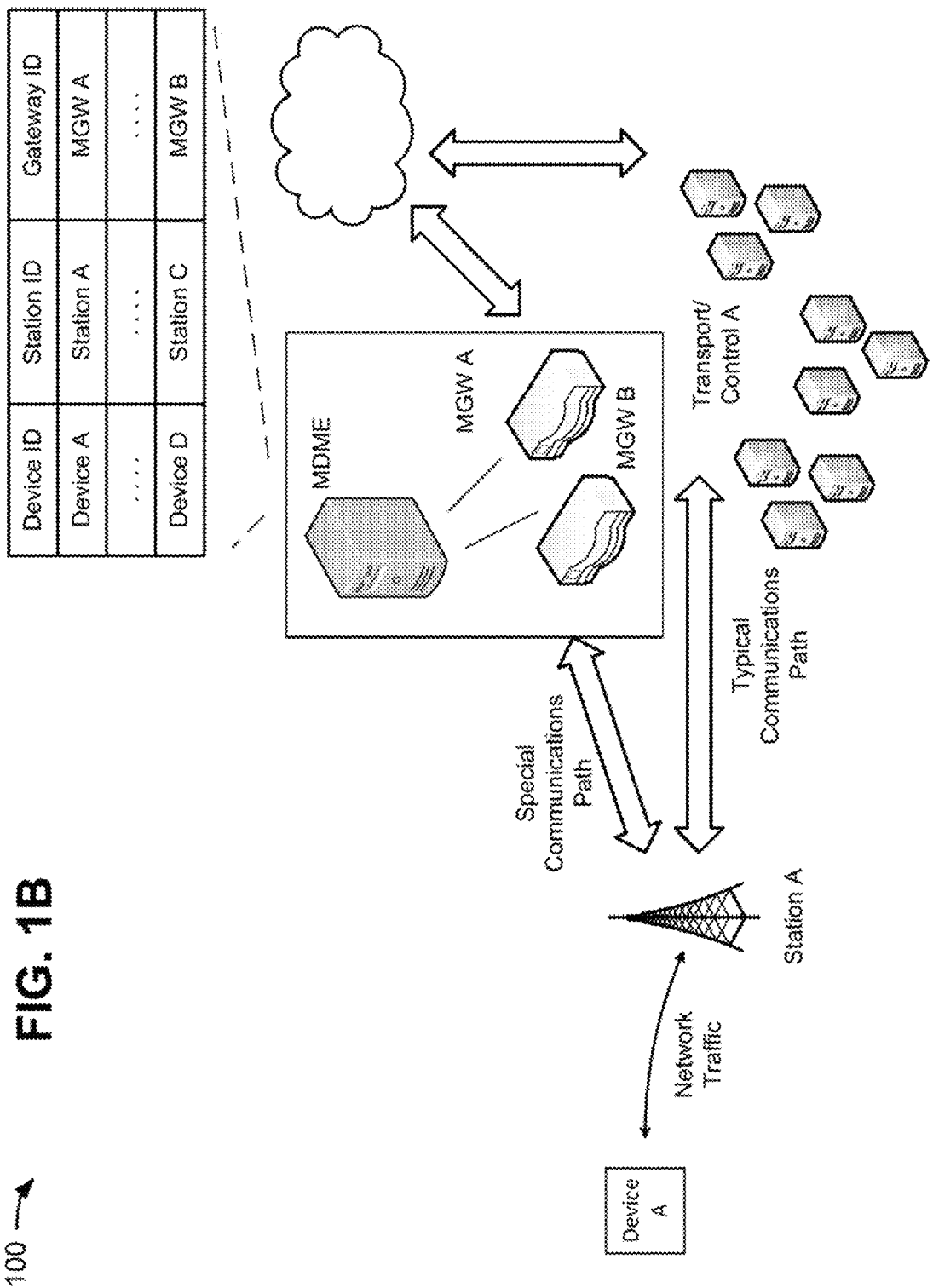

FIGS. 1A and 1B are diagrams of an overview of an example implementation 100 described herein. The example implementation 100 illustrates elements of a network, including a Service Area A and Service Area B, which may constitute geographic areas served by an access network infrastructure. Access network infrastructure may encompass elements to provide communications with devices having communications capabilities, such elements depicted in FIG. 1A as Station A, Station B and Station C. The access network may include wireless and/or wired communications capabilities. The example network further includes a Core Network infrastructure that implements control systems to achieve network management (such as access control, mobility management and resource allocation) and transport systems to provide data transport (such as packet routing and transmission). Core Network infrastructure may encompass elements to provide control functions to each Service Area, such as elements depicted as Control A and Control B, and elements to provide transport services to each Service Area, such as elements depicted as Transport A and Transport B.

The example Core Network includes a Machine Management System serving Service Area A and Service Area B. Machine Management System may include one or more devices that accomplish the machine device management services described in more detail below.

As shown in FIG. 1A, to illustrate usage of the example system, assume that a first machine device, shown as Device A, and a second, non-machine device, shown as Device B, are located in an area associated with Station A. As further shown, assume that a third machine device, shown as Device C, is located in an area associated with Station B. As further shown in FIG. 1A, assume that a fourth machine device, shown as Device D, is located in an area associated with Station C.

Device B, as a non-machine device, communicates through Station A and the Core Network in a conventional manner, utilizing the facilities of Control A and Transport A, as illustrated by the flow $F_B$. These communications may include control messaging between Device B and Control A to establish connectivity (for example, through a registration process) and manage mobility, as well as bearer transmissions through the Transport A facilities (which may be directed to other elements outside Core Network, such as private networks or the public Internet).

Device A, however, as machine device, communicates through Station A and the Core Network using a specialized path through the Machine Management System, as illustrated by the flow $F_A$. As will be detailed further below, communications with Device A are routed through the Core Network using existing protocols, avoiding Transport and/or Control elements. The Machine Management System assists in managing the machine devices and/or communications associated with the machine devices. For example, the Machine Management System may include one or more data structures that store relationships between machine devices, access network elements with which the machine devices communicate (e.g., a station that provides service to an area in which a machine device is located), and Machine Management System components with which the stations may communicate. Device C, as a machine device, communicates through Station B but likewise uses a specialized path through the Machine Management System as illustrated by Flow $F_C$. Device D, as a machine device, communicates through Station C but likewise uses a specialized path through the Machine Management System as illustrated by Flow $F_D$. Thus, in the example of FIG. 1A, the Machine Management System provides service to multiple stations in a service area (Station A and Station B), as well as multiple service areas (Area A and Area B). In other implementations, the Machine Management System can be implemented in multiple instances with service limited to certain stations or areas.

FIG. 1B shows further detail of establishing a special communications path for network traffic to and from machine devices as described above. FIG. 1B illustrates the situation involving Device A (a machine device) in communication with Station A. Machine Management System is implemented using a Machine Device Management Entity (MDME) in communication with one or more Machine Gateways (MGWs)—in FIG. 1B two machine gateways MGW A and MGW B are shown. To enable the special communications path for Device A, the MDME may store and provide information to the Device A, access network element servicing Device A (e.g., Station A), and/or an MGW that has been designated to service Device A (e.g., MGW A). Using this information, communications directed towards Device A may be received at MGW A and forwarded to Station A for ultimate delivery to Device A. Correspondingly, communications from Device A may be forwarded from Station A to MGW A for ultimate delivery to the destination.

In some implementations, the special communications path may take the form of a network "tunnel" that allows communications involving a machine device to be encapsulated within existing network protocols (thus avoiding the need to modify existing network elements). This tunneling information may be stored by the MDME and provided to the system elements (e.g., MGW A), thus allowing the network traffic received by such elements to be formatted and routed accordingly. In some implementations, the machine device traffic may also be transported through the MDME, such that the MDME communicates with the station serving the machine device to receive and transmit traffic. For example, communications to Device A may be received by MGW A, forwarded to the MDME, and transmitted from the MDME to Station A for delivery to Device A. Correspondingly, communications from Device A may be forwarded from Station A to the MDME, and transmitted from the MDME to MGW A for ultimate delivery to the destination. In other implementations, communications may bypass the MDME. Further details are provided below.

Because the traffic carried through the special communications paths established for machine devices is limited in comparison to the quantity/quality of the traffic carried over the typical communications path, the special communications paths can accommodate this traffic (even though the network protocols/elements involved were not originally designed to carry such traffic). The special communications paths are also able to bypass some of the existing network facilities that are not needed for machine devices, thereby removing those devices from management responsibilities of existing network elements (and thus reducing the burden large quantities of those devices may impose). The facilities provided in the special communications paths may also be able to provide additional capabilities that are of particular utility to machine devices but may be less useful or infeasible in the conventional network.

Figure 2A:
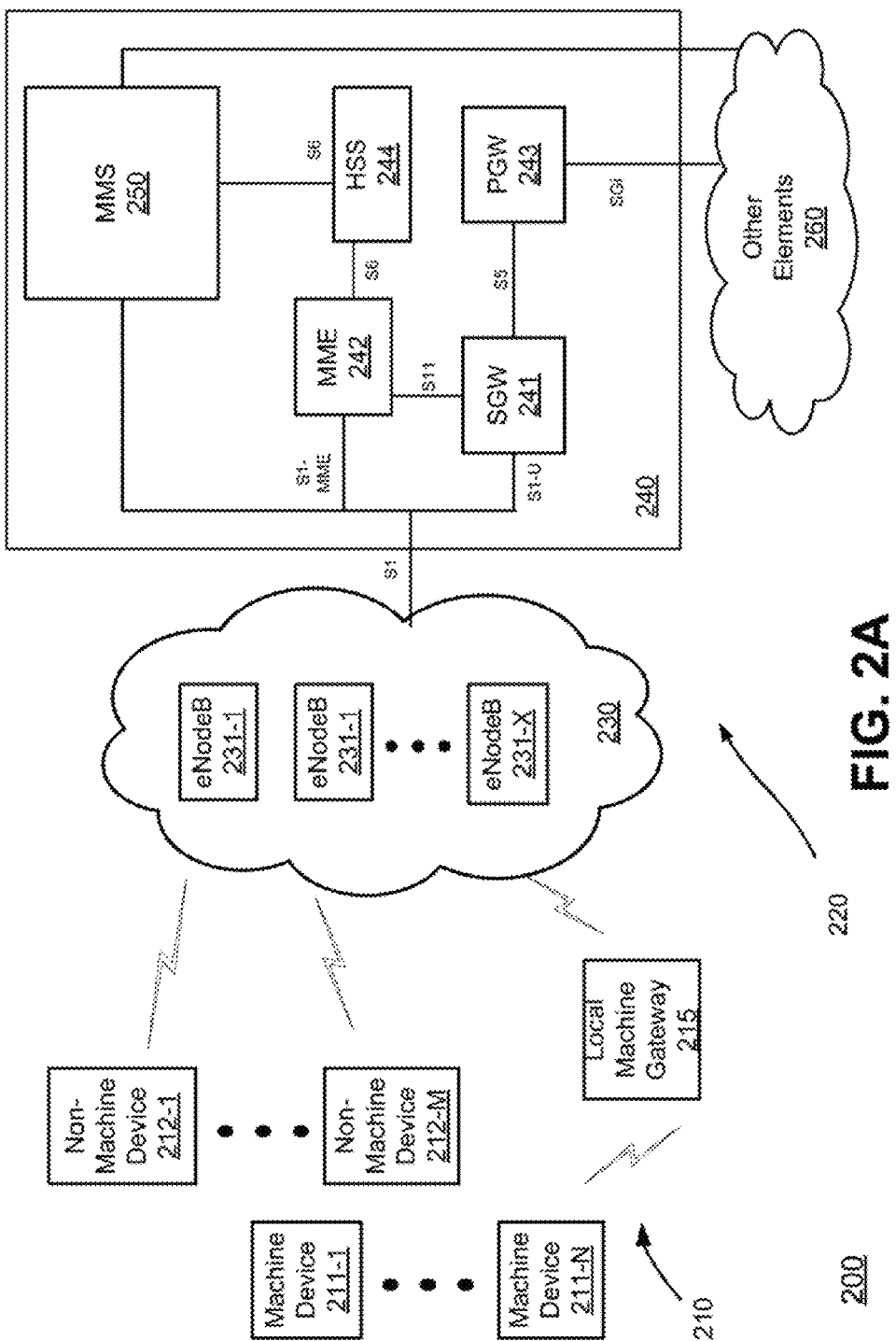
FIGS. 2A and 2B are diagrams of an example environment in which systems and/or methods, described herein, may be implemented.

FIG. 2A is a diagram of an example environment 200 in which systems and/or methods, described herein, may be implemented. Example environment 200 may implement elements of the well-known Long Term Evolution (LTE)-based mobile network. As shown in FIG. 2A, environment 200 includes a network 220 that implements a radio access network (RAN) 230 implemented through one or more eNodeBs 231-1 through 231-X (hereinafter referred to collectively as "eNodeBs 231," and individually as an "eNodeB 231"). eNodeBs 231 may be deployed in a geographically dispersed configuration in order to provide wireless coverage over multiple areas. eNodeBs 231 may be deployed in traditional "macro" cell deployments, as well as in smaller service geographies commonly referred to as "small," "micro," "pico" and "femto" cell deployments. eNodeBs 231 may also employ "extender" technologies to enhance wireless coverage areas, such as remote/distributed antenna deployments.

Network 220 further implements a Core Network 240 using one or more Signaling Gateways (SGWs) 241, one or more Mobility Management Entities (MMEs) 242, one or more Packet Gateways (PGWs) 243 and one or more Home Subscriber Servers (HSSs) 244. These Core Network elements may be implemented according to the requirements of the well-known Enhanced Packet Core (EPC) architecture, including interconnections through interfaces such as: the S1 interface between eNodeBs 231 and SGWs 241 (S1-U) and MMEs 242 (S1-MME); the S5 interface between PGWs 243 and SGWs 241, the S11 interface between MMEs 242 and SGWs 241, and the S6 interface between MMEs 242 and HSSs 244. PGWs 243 may further be connected via an interface SGi to other elements 260 (such as an IP Multimedia Subsystem (IMS), private networks or the public Internet). The aforementioned elements and interfaces may be implemented in any well-known manner, including as distributed instances or multiple redundant systems to enhance network management and ensure system reliability, and interconnected using known wired and wireless networking technologies.

Also shown in FIG. 2A is Machine Management Service (MMS) 250, which is in communications with eNodeBs 231, HSS 244 and external elements 260. The characteristics of MMS 250 will be further described below. Network 220 may include one or more MMSes 250, which may be deployed as needed to handle the traffic demands of network 220 (e.g., to serve different geographic areas, achieve load balancing, endure system redundancy for reliability, etc.).

Environment 200 further includes a set of user equipment (UE) devices 210 comprising one or more machine UE devices 211-1 through 211-N (hereinafter referred to collectively as "machine devices 211," and individually as "machine device 211"), and one or more non-machine UE devices 212-1 through 212-M (hereinafter referred to collectively as "non-machine devices 212," and individually as "non-machine device 212.") Non-machine devices 212 may comprise those devices that communicate using network 220 in the conventional known fashion (some examples being devices commonly referred to as "smartphones," "laptops," "tablets," and other general purpose computing devices). Machine UE devices 211 may include one or more devices identified as machine devices due to their limited network needs (as noted above). For example, machine UE devices 211 may include devices such as sensors (e.g., thermostat, light sensor, utility meter, camera, timer, etc.), actuators (e.g., water valve, light switch, motor, etc.) or devices that include combinations of these (e.g., a home appliance, vending machine, tracking device, parking meter, etc.).

Machine UE devices 211 include capabilities to communicate with entities external to the device. The communications capabilities may take the form of network access facilities—for example an LTE communications module that allows for communication via network 220. However, the communications capabilities may also take other forms. For example, as shown in FIG. 2, a local machine gateway 215 may be used to act as a communications gateway between RAN 230 and machine devices 211 that use the gateway. Local machine gateway 215 includes network access facilities to allow for communication via network 220, and may also include communications facilities that allow for communication in other formats with machine devices 211. For example, where machine devices 211 use different communications standards than RAN 230 (examples including Ethernet, Wi-Fi, ZigBee, X10, Bluetooth, infrared, and many others), local machine gateway 215 can act as the LTE network endpoint and provide facilities to allow communication to and from machine devices 211 connected to the local machine gateway 215.

In some implementations, machine UE devices 211 may each be associated with an identifier, such as a device name, a subscriber identity module (SIM) card, a device identity (e.g., a country code, a network code, and/or a subscriber identifier), a network address (e.g., an IP version 6 (IPv6) address, a media access control (MAC) address, a port address, etc.), an international mobile subscriber identity (IMSI), a globally unique temporary identifier (GUTI), or the like. The associated identifier may be statically assigned to the device (such as a MAC address or IMSI) or may be dynamically assigned (such as an IP address or GUTI). In some implementations, the identifier is configured to provide information that indicates that the device qualifies as a machine device. For example, the public land mobile network ID (PLMN-ID) or other portion of the IMSI code space can be mapped such that the occurrence of certain codes indicates that the device should be treated as a machine device (with a benefit that the PLMN-ID constitutes a portion of both the IMSI and the GUTI). Other code mapping configurations could also be used within other identifier spaces. (As should be evident from this example, the identifier need not uniquely identify the machine device 211, but may simply identify that the machine device 211 should be treated as a machine device.)

In implementations where a machine UE device 211 is connecting to network 220 via local machine gateway 215, local machine gateway 215 may act as a "proxy" for machine device 211. For example, local machine gateway 215 may transmit traffic from machine device 211 into network 220 using the machine identifier associated with machine device 211. Likewise, local machine gateway 215 may receive traffic from network 220 that uses the machine identifier for machine device 211 and provide that traffic to machine device 211 in a format consistent with the connection technology used to connect machine device 211 and local machine gateway 215. Local gateway 215 may maintain mappings to allow for such proxy activity.

MMS 250 may include one or more devices capable of receiving, generating, processing, storing, and/or providing information associated with management of connections and/or communications associated with machine devices 211. For example, MMS 250 may include networking devices, storage devices, server devices, or the like. In some implementations, MMS 250 may perform operations relating to registering machine devices 211 (e.g., with network 220), managing connectivity of machine devices 211, storing relationship information that identifies connectivity of machine devices 211 with other elements of network 220, and transport of communications with machine devices 211. MMS 250 may communicate with eNodeBs 231 using the existing S1-MME interface and may communicate with HSSs 244 using the existing S6 interface. Alternatively, specific interfaces may be established between MMS 250 and eNodeBs 231 and HSSs 244.

In some implementations, communications between MMS 250 and machine devices 211 use LTE non-access stratum (NAS) messages for both control and data transport. For example, a machine device 211 attempting to establish a connection to network 220 may send one or more uplink NAS message to MMS 250 in an RRC message to eNodeB 231 to request a connection. eNodeB 231 forwards the NAS message(s) to MMS 250, which uses the information in the NAS message(s) to register the machine device 211 and/or establish the special communications path. Thereafter, uplink communications from machine device 211 may take the form of NAS messages encapsulating data to be transmitted, which are likewise forwarded from the serving eNodeB 231 to MMS 250. MMS 250 may then determine that the NAS message contains encapsulated data and de-encapsulate the data for transmission to external elements 260 for ultimate delivery. Downlink NAS messages may likewise be used to transmit data to machine device 211 from MMS 250 using a similar technique.

One benefit of using NAS messages for establishing the special communications path for machine devices 211 is that existing network equipment is already capable of processing NAS messages for control purposes. For example, known eNodeBs 231 are already configured to forward NAS messages between MMEs 242 and non-machine devices 212 for device control operations such as registration or mobility, and therefore very little (if any) modification would be necessary to existing network systems. In other implementations, other messaging protocols/interfaces may be used with similar operational benefits.

Figure 2B:
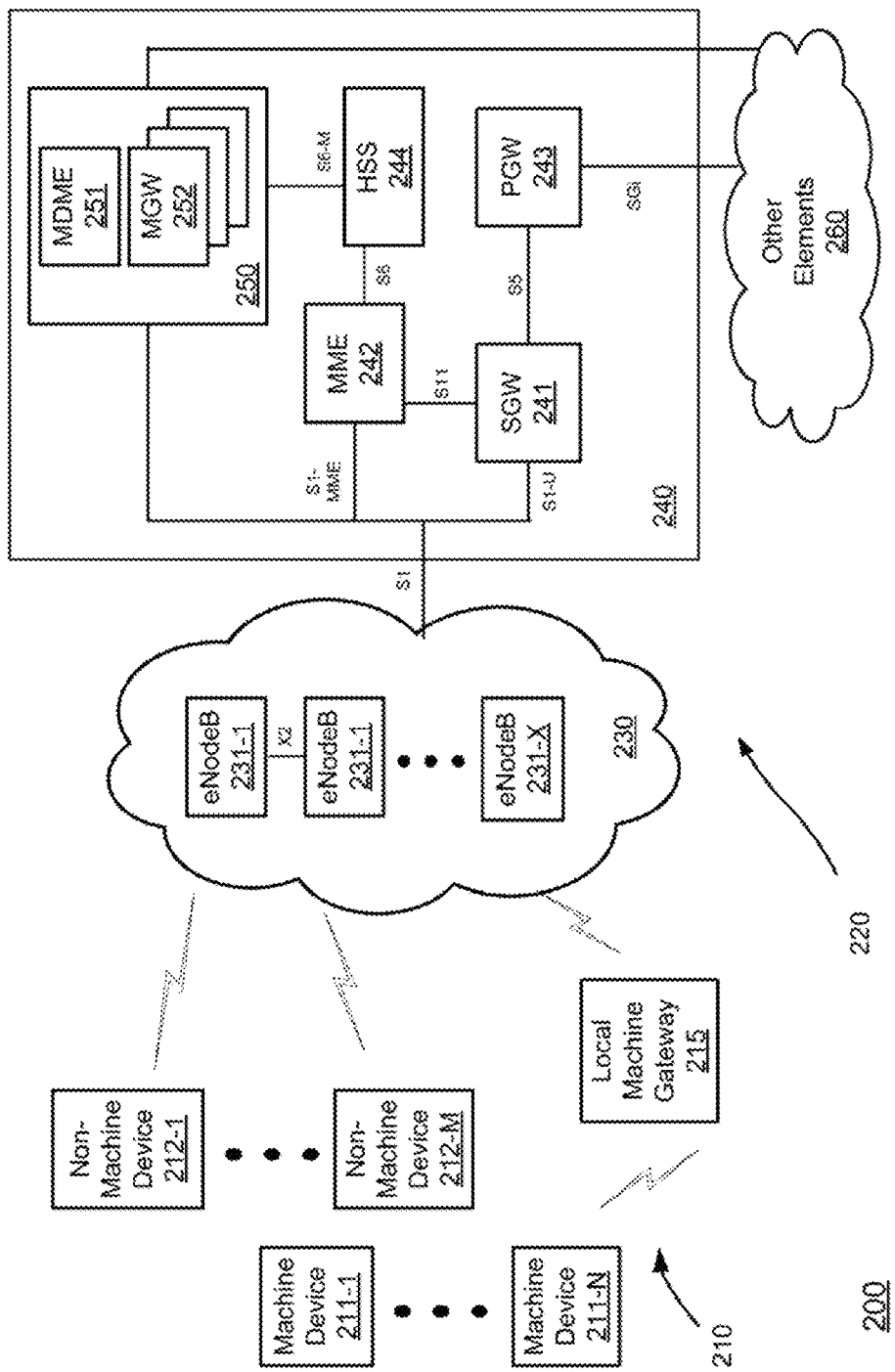
Figure 3:
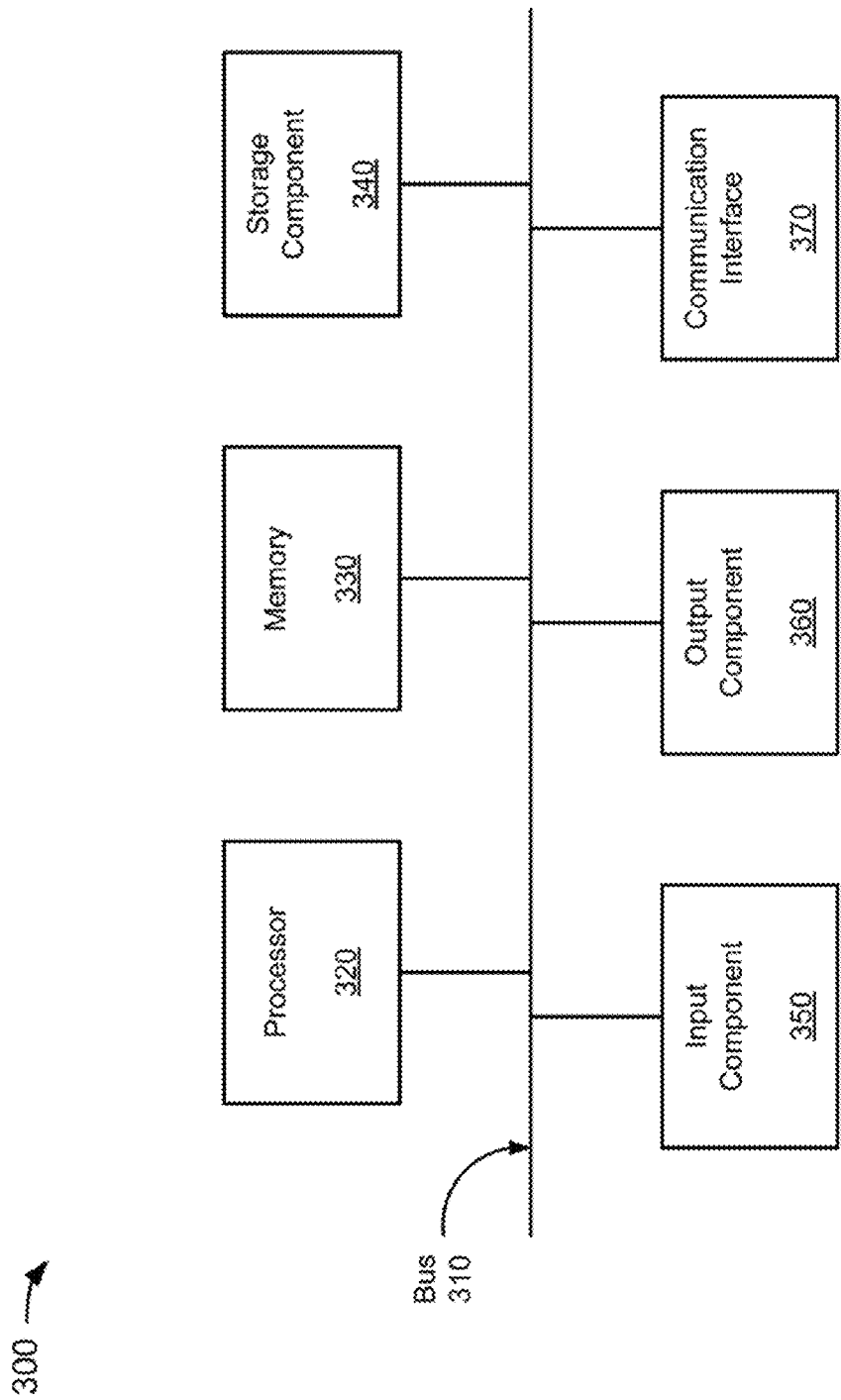
FIG. 3 is a diagram of example components of one or more devices of FIG. 2.

FIG. 2B provides further detail regarding a potential implementation of MMS 250. As shown in FIG. 2B, MMS 250 comprises one or more machine device management entities (MDMEs) 251 and one or more machine gateways (MGWs) 252. MDMEs 251 and MGWs 252 interact to provide the services of MMS 250. For example, in some implementations, MDME 251 may perform operations relating to registering machine UE devices 211 (e.g., with network 220), managing connectivity of machine devices 211, storing relationship information that identifies paths for connectivity of machine devices 211 with other elements of network 220, and/or encapsulation/de-encapsulation of user data being communicated with machine devices 211. MGWs 252 may act as gateways for communications between external elements 260 and machine devices 211, and in some implementations may include routing and/or encapsulation/de-encapsulation services. MDME 251 and MGW 252 may be implemented in the same physical system or separate systems in communication. Such systems may include one or more devices capable of receiving, generating, processing, storing, and/or providing communications, such as routers, modems, switches, firewalls, network interface cards ("NICs"), storage devices, processors, or the like. In some implementations, a single MDME 251 may be associated with multiple MGWs 252, which may allow additional traffic handling capacity at a lower overall system expense.

Figure 4:
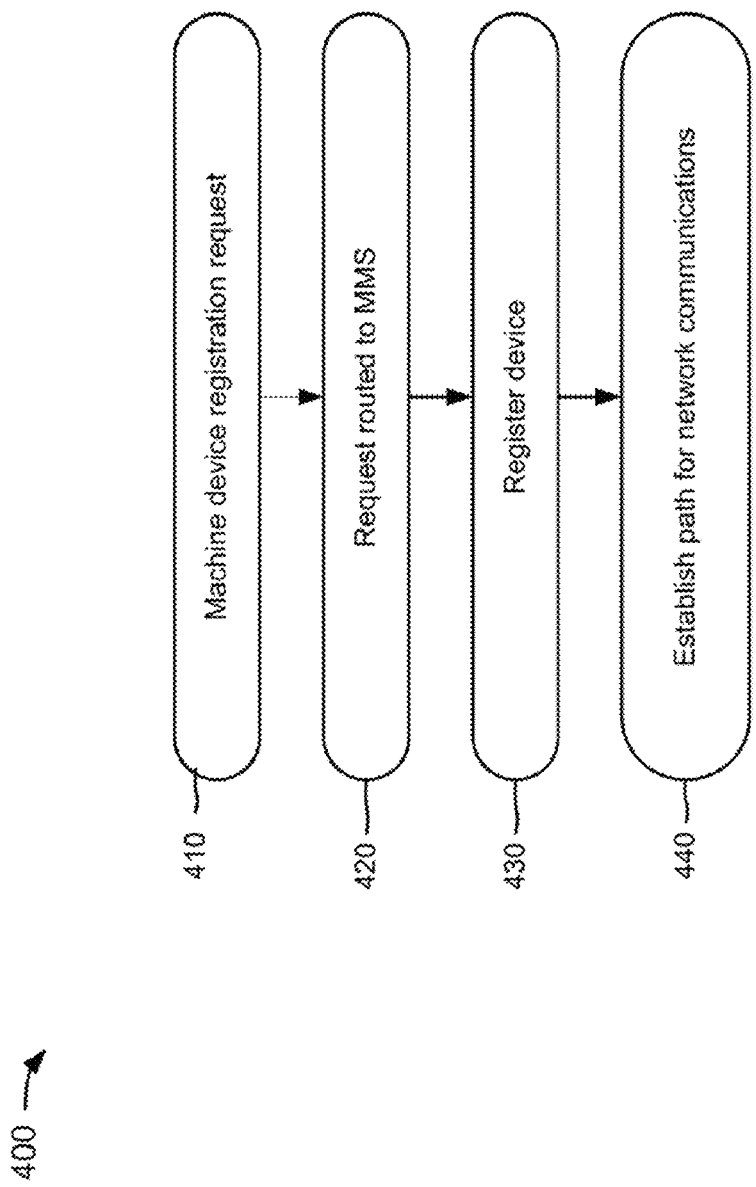
FIG. 4 is a flow chart of an example process for establishing an alternate communications path for transmitting network traffic to or from machine devices.

FIG. 4 is a flow chart of an example process 400 for establishing an alternate communications path for transmitting traffic to or from machine devices. Although the process 400 may be applied in various implementations, it will be described in the context of the example LTE network implementation of FIGS. 2A and 2B.

As shown in FIG. 4, process 400 may include receiving a request to register a machine UE device with the network at a serving station (block 410). Referring to FIG. 2A, machine UE device 211 may attempt to register with network 220, for example, when machine device 211 initially turns on communications capabilities (e.g., energizes a radio), or when machine device 211 enters a geographic area served by an eNodeB 231. As an example, machine device 211 may send an uplink message containing its identifier to eNodeB 231 as part of the registration process. As noted above, a machine identifier may include, for example, a device name, an international mobile subscriber identity (IMSI), a globally unique temporary identifier (GUTI), a network address that identifies machine UE device 211 on a network (e.g., an internet protocol (IP) address, a media access control (MAC) address, a port address, etc.), a mobile subscriber integrated services digital network-number (MSISDN), or the like. In LTE-based networks, this registration message may take the format of one or more NAS messages requesting network registration, the message(s) including one or more identifiers of the machine device 211 (e.g., an IMSI, a GUTI).

In some implementations where local machine gateway 215 is used to provide connectivity to machine device 211, local machine gateway 215 may provide the registration request as a proxy for machine device 211. For example, local machine gateway 215 may use an identifier associated with local machine gateway 215 and/or machine device 211 to request registration with network 220, and upon registration perform forwarding of network traffic associated with machine device 211.

Upon receipt of the request to register, the serving station may then route the request to the MMS (step 420). Referring to FIG. 2A, the eNodeB 231 through which machine device 211 is requesting network registration may route the request to MMS 250. This serving eNodeB 231 may determine the proper routing in various ways. For example, the eNodeB may be pre-configured with logic that determines machine devices from non-machine devices based on the provided identifier. This logic may take the form of a data structure of identifiers that have been pre-configured as associated with machine devices. It may also take the form of rules for interpreting the identifier to the extent the identifier inherently identifies machine devices (e.g., where a portion of the IMSI indicates a device that has been assigned to be treated as a machine device). In an example LTE network implementation, a NAS message being transported from the machine UE device to the eNodeB may include the IMSI or GUTL of the machine device within the NAS message, and (additionally or alternatively), may include additional device identifiers (e.g., a PLMN-ID associated with the machine device) within the lower layer protocols that are providing transport of the NAS message (e.g., Radio Resource Control (RRC) protocol, etc.). Serving eNodeB 231 may then determine that the received PLMN-ID and/or IMSI/GUTI is associated with a device that should be treated as a machine device. Accordingly, serving eNodeB 231 forwards the NAS message to MMS 250.

The MMS may then register the machine device (step 430). Referring to FIG. 2A, MMS 250 may receive one or more messages from serving eNodeB 231 that includes one or more identifiers that identify machine UE device 211. In some implementations, the message(s) may be NAS messages that include the IMSI/GUTI of machine device 211, as well as the node ID of serving eNodeB 231. In some implementations, the message(s) may include a device name providing a unique identifier within a namespace, such as a uniform resource locator (URL) or other hierarchical naming convention. MMS 250 may use the identifier for machine device 211 to query HSS 244 to determine, for example, if machine device 211 is permitted to register on network 220. If machine device 211 is authorized, HSS 244 responds with typical registration information for user equipment, such as security information (e.g., encryption keys, etc.), and the like. In some implementations, HSS 244 may also provide other information relevant to a machine device, such as a device type of machine device 211 (e.g., a refrigerator, a vending machine, a tracking device, a parking meter, etc.), information that identifies one or more policies for managing machine device 211 (e.g., information that identifies a quantity of network communications permissible by machine device 211 in a particular time period, information that identifies a quality of service level for communications associated with machine device 211, etc.), information that identifies one or more services to be provided to machine device 211 (e.g., data buffering), or the like. Additionally, or alternatively, MMS 250 may determine some of the registration information for machine device 211 (e.g., based on the identifier associated with machine device 211, based on the eNodeB 231 providing service to machine device 211, etc.). MMS 250 may also assign a network address to machine device 211 (e.g., an IP network address).

MMS 250 may store registration information associated with machine UE device 211. For example, one or more device identifiers of machine device 211 and the identifier associated with serving eNodeB 231 may be stored, and/or network addresses associated with each (if different than the identifiers), as well as tracking area information. Other information associated with the machine device may also be stored. For example, date/times associated with registration expirations, connection checks ("heartbeats") or other polling activities may be stored, which may be useful for machine devices with limited connectivity.

In embodiments such as FIG. 2I where MMS 250 is implemented as an MDME 251 and one or more MGWs 252, the foregoing may be performed by the MDME 251.

MMS 250 may establish a path for communications with machine UE device 211 through network 220 (step 440). As noted above, the path will avoid existing core network systems. Referring to FIG. 2A, MMS 250 establishes a path that transmits communications to and from machine device 211 through MMS 250. Establishing the path may take various forms. For example, MMS 250 may maintain data structures that contain information needed to transmit communications to and from machine device 211. Illustratively, MMS 250 may retain information that allows a downlink message received at MMS 250 and identified as directed towards machine UE device 211 to be forwarded to serving eNodeB 231 for delivery to machine device 211. In some implementations, this information may include a device ID or an address assigned to machine device 211, such that messages directed to machine device 211 are expected to contain the device ID and/or address, and the device ID and/or address is used to retrieve the correct serving eNodeB 231 addressing information for message forwarding. In some implementations, message forwarding comprises encapsulation of the message in a downlink NAS message directed towards machine UE device 211. Likewise, MMS 250 may retain information that allows an uplink message received at MMS 250 from a machine UE device 211 through a serving eNodeB 231 to be forwarded to its destination. In some implementations, message forwarding comprises de-encapsulation of the message from an uplink NAS message directed towards MMS 250.

Referring to FIG. 2B, in embodiments of MMS 250 employing an MDME 251 and one or more separate MGW 252 services, establishing the path may include determining an MGW 252 to serve as the gateway to transport network traffic associated with the machine UE device 211. For example, MDME 251 may determine an MGW 252 to be associated with providing service to machine device 211 based on various potential criteria, such as load balancing, geographic location, processing capacity, etc. A gateway identifier may be associated with a particular MGW 252, which may include, for example, a gateway name, a network address that identifies MGW 252 on a network (e.g., a domain name, an IP address, a MAC address, etc.), or the like. MDME 251 may store the gateway identifier for the MGW 252 that has been assigned to serve the machine device 211, for example, as part of the registration information associated with machine device 211, or in another structure to be used for transmission of communications.

MDME 251 may also provide path information to serving MGW 252 and/or serving eNodeB 231. For example, the serving MGW 252 may be provided with information needed to forward messages it receives that are directed to machine UE device 211. This forwarding may take various forms, and will be further described below. In some implementations, serving eNodeB 231 may be provided with information identifying the machine UE device 211 and serving MGW 252 in order to allow for routing of messages directly between machine UE device 211 and serving MGW 252 (thereby bypassing MDME 251).

MMS 250 may also provide information to a directory service to permit discovery of addressing information needed to communication with machine UE device 211. For example, MMS 250 may communicate with a Domain Name Service (DNS) system or other directory service/database to establish/update a record that allows other devices to communicate with the machine UE device 211 (e.g., the record may provide associations of machine device identifiers, such as device names, device identifiers, network addresses, etc). The record may cause messages being sent to machine device 211 to be routed to MMS 250. In embodiments such as FIG. 2B that use one or more separate MGWs 252, the record may cause messages being sent to machine device 211 to be sent to the MGW 252 that has been assigned to serve machine device 211

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

For machine devices 211 that can be moved, if machine device 211 moves from a first geographic area associated with a first eNodeB 231 to a second geographic area associated with a second eNodeB 231, the machine device 211 may attempt to register with the second eNodeB 231 (for example, using the registration process identified above). The second eNodeB 231 may provide the registration request to MMS 250, and MMS 250 may determine whether to update the registration information for machine device 211, such as its new serving eNodeB 231, and (in embodiments using multiple MGWs 252) reassignment of a new MGW 252. In network implementations where multiple MMSes 250 are employed, if registration is attempted at a new MMS 250, the new MMS 250 may attempt to send a deregistration message to the old MMS 250 (if known).

Figure 5A:
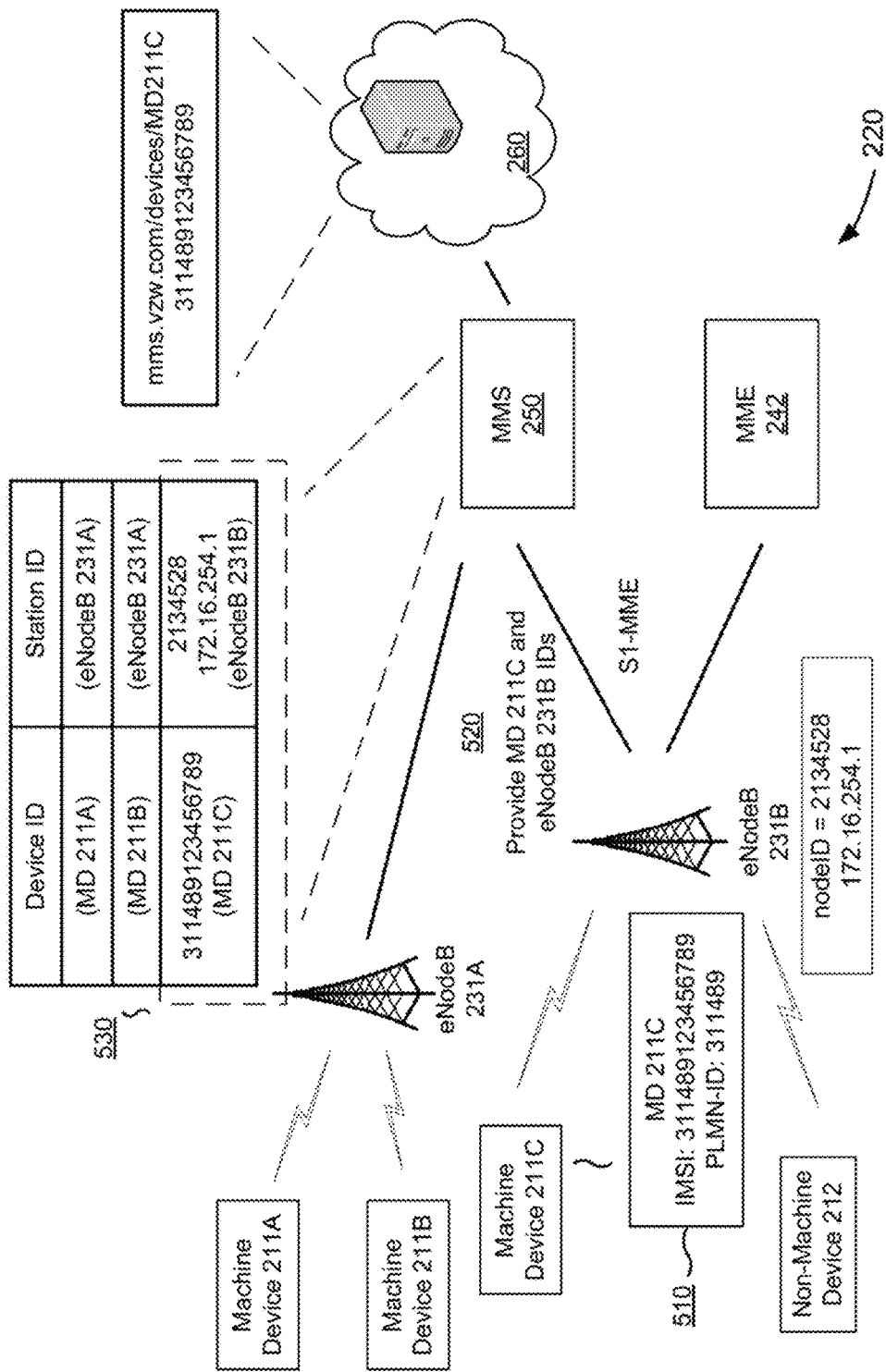
FIGS. 5A-5C are diagrams of an example implementation relating to the example process shown in FIG. 4.
Figure 5B:
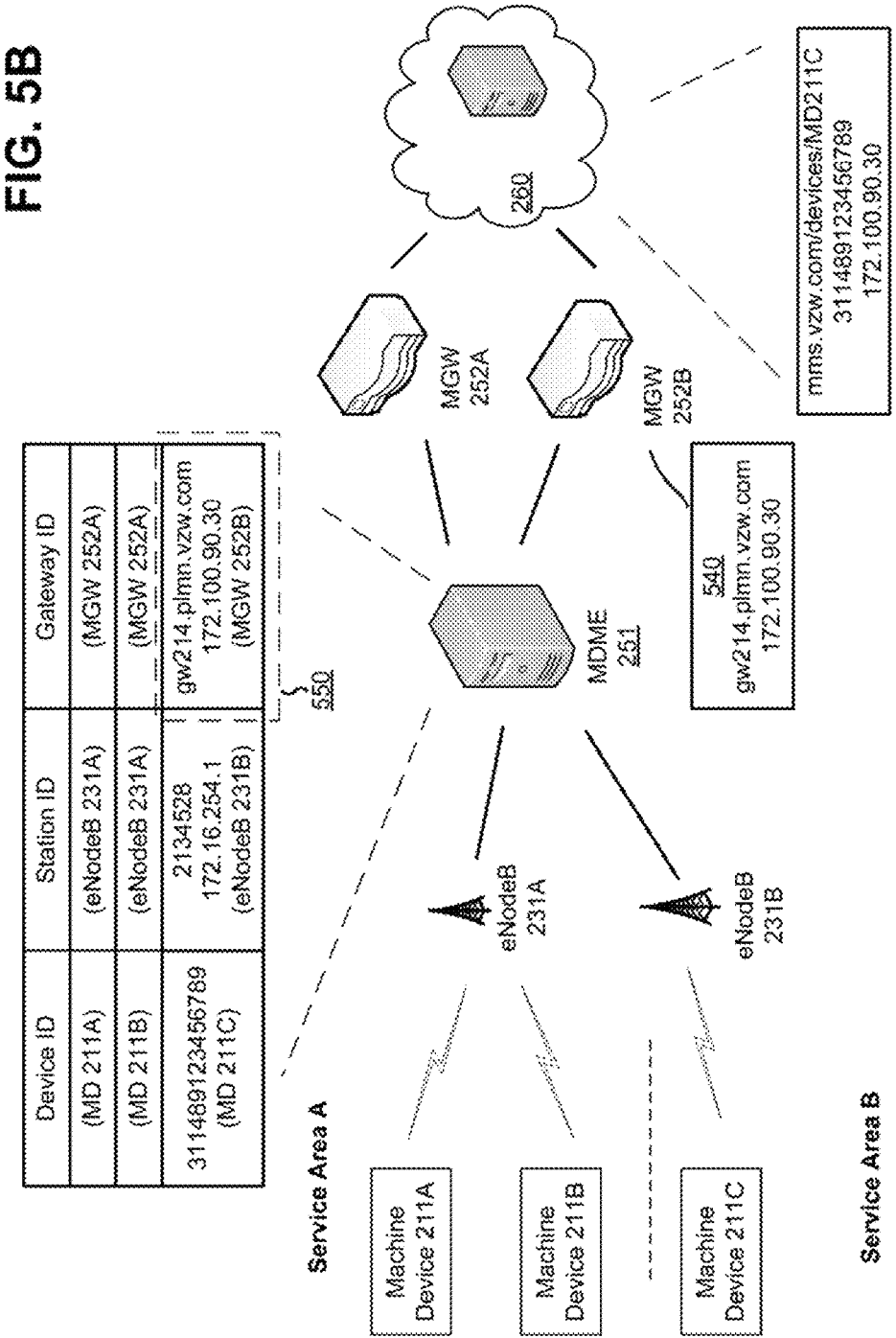
Figure 5C:
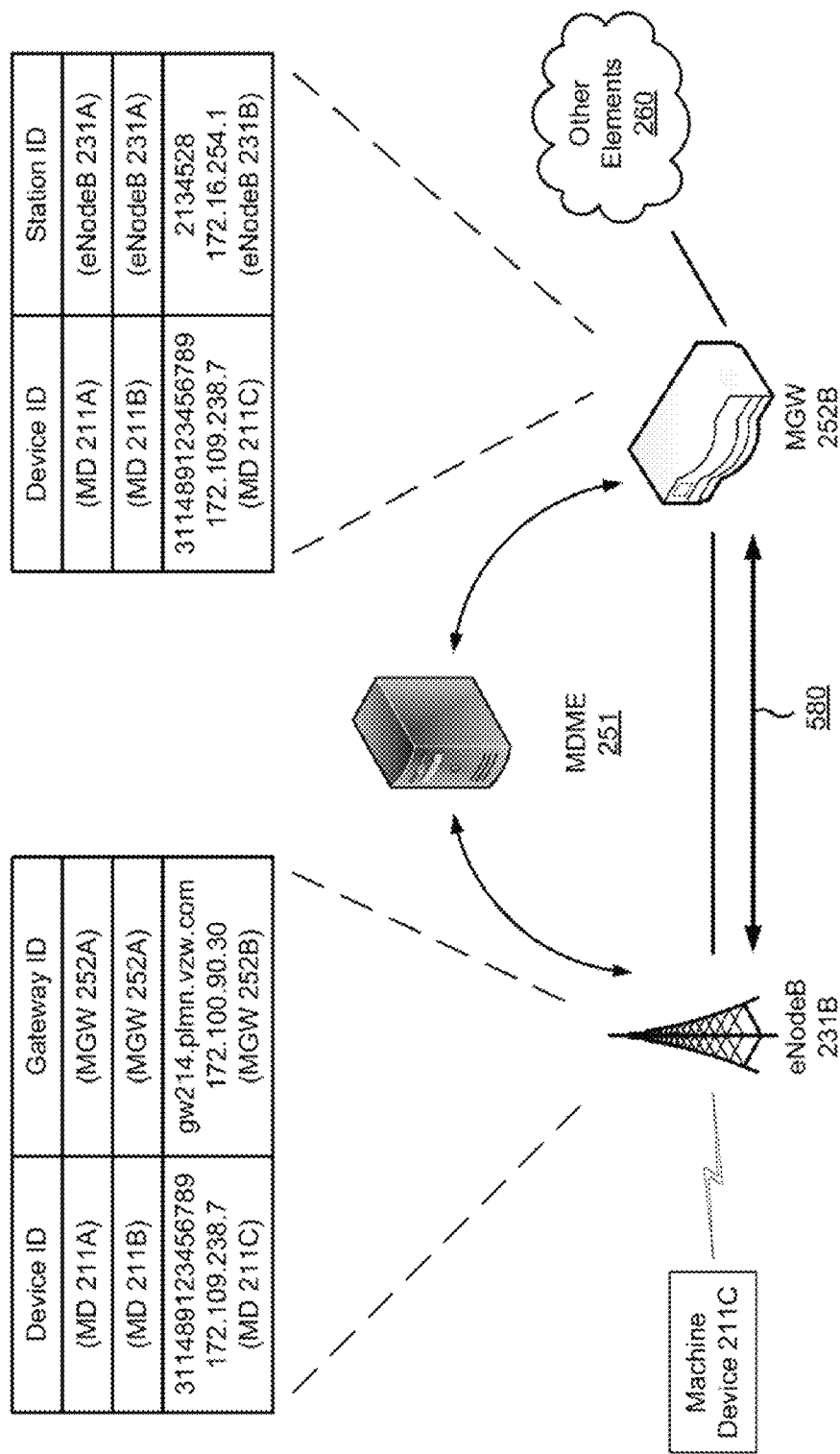

FIGS. 5A-5C are diagrams of example implementations relating to the process 400 shown in FIG. 4. FIGS. 5A-5C show examples of various aspects of establishing the special communications paths between machine UE devices 211 and MMS 250.

In the example shown in FIG. 5A, a machine UE device 211C (MD 211C) may provide a request to register on network 220, by sending one or more messages to serving eNodeB 231B. As shown, assume that the registration request includes one or more device identifiers 510, shown as an IMSI of "311489123456789" and PLMN-ID of "311489." As shown by reference number 520, serving eNodeB 231B may then provide the registration request to MMS 250, for example, by identifying that machine UE device 211C is a machine device and should be under the control of MMS 250. eNodeB 231B may make this determination, for example, by comparing one or more of the device identifiers of machine UE device 211C to a data structure mapping device identifiers to control entity identities, by determining information inherent to the device identifiers (such as a coding scheme that identifies machine device 211C as a machine device), or other determination method. In some embodiments, the registration request is made using one or more NAS messages sent from machine UE device 211C to eNodeB 231B over the access network, with the IMSI "311489123456789" included in the NAS message and the PLMN-ID "311489" included in the RRC protocol layer transporting the NAS message. eNodeB 231B may determine that machine UE device 211C should be sent to MMS 250 by determining that the PLMN-ID of "311489" is associated with machine devices.

The registration request is sent from eNodeB 231B using NAS messaging over the S1-MME interface using SCTP transport directed to MMS 250, and includes one or more station identifiers that identify eNodeB 231B, shown in FIG. 5A as a node ID of "2134528" and an IP address of "172.16.254.1." Other identifiers of eNodeB could also be used. As shown by reference number 530, MMS 250 stores the device identifiers and the station identifiers in such a way that they are associated for future use (for example, in a table or other data structure that indicates relation). MMS 250 may also determine additional device identifiers for machine UE device 211C. For example, as part of the registration process, MMS 250 may determine that IMSI "311489123456789" is associated with device name "mms.vzw.com/devices/MD211C." This determination can be performed in various ways, for example, the additional identifier may be provided by machine UE device 211C, it may be included as part of the registration information retrieved from HSS 244, or other methods. The additional device identifier may be stored by MMS 250.

In some embodiments, device identifiers of machine UE device 211C may also be provided to directory services such as a DNS service to allow external elements 260 to be able to discover addressing information in order to route messages to machine UE device 211C. As shown in FIG. 5A, a record may be created in a directory service that associates the IMSI of machine device 211C ("311489123456789") with the device name of machine device 211C ("mms.vzw.com/devices/MD211C").

Non-machine UE device 212 may also request registration with network 220 through eNodeB 231B. However, in contrast to the operations associated with machine UE device 211C, eNodeB 231B will recognize that non-machine device 212 should be controlled using the standard network control entity—MME 242—and provides the registration request to MME 242 using the S1-MME interface, after which non-machine device 212 will interact with network 220 in a conventional manner.

As further shown in FIG. 5A, machine UE devices 211A and 211B may also register with network 220, in this case through eNodeB 231A. MMS 250 stores the respective device IDs and station IDs similarly to machine UE device 211C. In this manner MMS 250 may control multiple machine UE devices 211 over network 220.

FIG. 5B illustrates additional registration activity in the context of an MMS 250 utilizing an MDME 251 and one or more separate MGWs 252. In this case, MDME 251 may perform the registration operations described above with respect to FIG. 4 and FIG. 5A. In some embodiments, MDME 251 may determine an MGW 252 to be assigned to serve a registered machine UE device. This determination can be done in various ways—load balancing, geographic mapping, etc. As shown in FIG. 5B, and by reference number 540, MDME 251 determines that MGW 252B provides service to a service area which includes eNodeB 231B, and determines one or more gateway identifiers associated with MGW 252B, shown as a domain name of "gw214.plmn.vzw.com" and as an IP address of "172.100.90.80." Other identifiers could also be used. As shown by reference number 550, MDME 251 stores the gateway identifiers in a manner to show the association with machine device 211C and/or eNodeB 231B. Similar associations are recorded for machine devices 211A and 211B, which are indicated in FIG. 5B to be served by MGW 252A. MDME 251 may further provide one or more gateway identifiers to directory services in order to allow external elements 260 to obtain addressing information in order to route messages to machine device 211C. For example, as shown in FIG. 5B, a record may be created in a directory service that associates the IMSI of machine device 211C ("311489123456789") with the device name of machine device 211C ("mms.vzw.com/devices/MD211C") and an IP address of MGW 252B ("172.100.90.30").

In some embodiments, MDME 251 may not assign a particular MGW 252 as serving a machine UE device. For example, MDME 251 may route uplink messages it receives to one of the MGWs 252 according to a forwarding convention (e.g., round robin, address allocation, scheduling, etc.), and each MGW 252 may be configured to route downlink messages it receives to its associated MDME 251. Conventional load balancing mechanisms may be employed to distribute downlink messages over the MGWs 252.

FIG. 5C shows a further example illustrating a possible implementation in which a direct communication path 580 may be established between a serving eNodeB 231 and a serving MGW 252 for a machine UE device. As noted above, in some embodiments, user data communications between machine UE device 211 and MGW 252 may be routed to avoid MDME 251. One example configuration to implement this direct communication path is to establish a path for user data messages between eNodeB 231 and MGW 252. This path could be implemented in various ways. In some embodiments, eNodeB 231 may maintain a data structure that associates user data messages from machine UE devices with machine gateways to allow message routing. For example, as part of the registration operation for machine UE device 211C, MDME 251 may signal to eNodeB 231B that future uplink user data messages from machine device 211C should be routed to MGW 252B. Likewise, MDME 251 may signal to MGW 252B that future downlink user data messages to machine device 211C should be routed to eNodeB 231B. This direct communications path 580 may avoid the need to maintain bearer/session information for each machine UE device 211, thereby eliminating the signaling overhead associated with maintaining bearers/sessions.

As indicated above, FIGS. 5A-5C are provided merely as examples. Other implementations are possible and may differ from what was described with regard to FIGS. 5A-5C.

Figure 6:
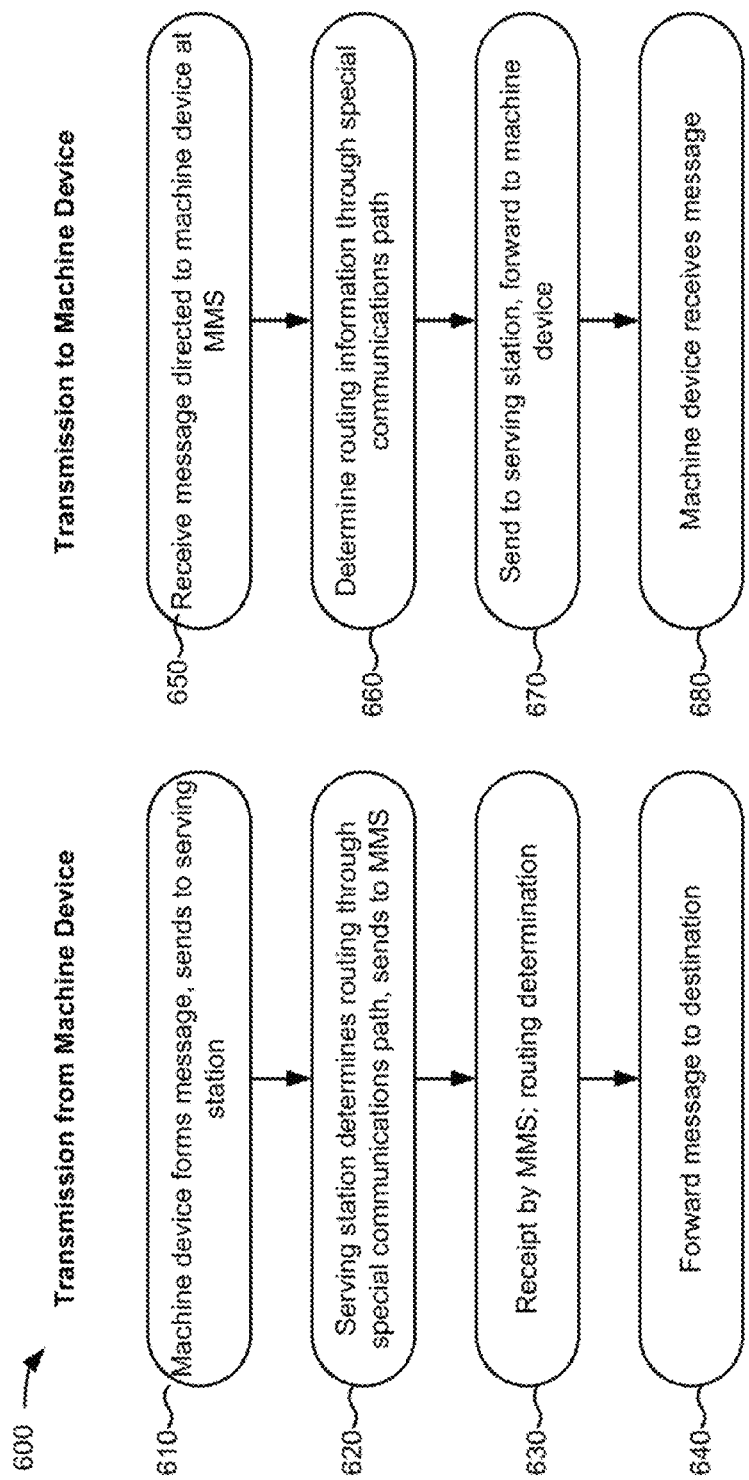
FIG. 6 is a flow chart of an example process for transmitting network traffic, associated with a machine device, via a network tunnel.

FIG. 6 is a flow chart of an example process 600 for transmitting data associated with a machine device via the special connection paths established as described above. One or more process blocks of FIG. 6 may be performed by the machine device 211, the serving eNodeB 231 and/or the MMS 250 (or its components), depending on the direction of transmission.

Starting first with "uplink" transmissions originating from a machine UE device 211, as shown in FIG. 6, machine UE device 211 may initiate a data transmission by forming an uplink user data message (step 610) to be sent over network 220 to one or more destinations (identified, for example, by a destination network address). In the context of examples described above, machine UE device 211 may formulate a NAS message that encapsulates the user data message being sent by the device to the destination, and send this uplink NAS message to serving eNodeB 231 via the access network. The uplink NAS message may include one or more device IDs for machine UE device 211 (e.g., a network address, IMSI, PLMN-ID). The machine UE device 211 may indicate in the NAS message that data is encapsulated within the message, for example, by placing data indicative of encapsulation in one or more fields of the NAS message (e.g., protocol discriminator, message type, etc.). In step 620, serving eNodeB 231 receives the message from machine UE device 211, identifies the message for routing using the special communications path, and forwards the message over the special communications path. In the context of the examples provided above, the uplink NAS message from machine UE device 211 may be received by the serving eNodeB 231, which then determines that NAS messages from machine UE device 211 should be routed to MMS 250 (for example, based on one or more device IDs in the NAS message or in the lower layer protocols transporting the NAS message, such as the RRC protocol). eNodeB 231 then forwards the uplink NAS message to MMS 250, for example, using the S1-MME interface between eNodeB 231 and MMS 250 (utilizing the existing SCTP connection).

In step 630, MMS 250 receives the uplink message from eNodeB 231 and determines how to dispose of the message. In the context of the examples described above, the NAS message may be received from eNodeB 231 at MMS 250, and identified as containing encapsulated data. This determination may be based on various indications, such as identifiers in the NAS message indicating that the message includes encapsulated bearer traffic (e.g., NAS header fields such as the protocol discriminator field, message type field, etc.), and/or identifiers associated with the source of the message (e.g., based on a device ID) that would indicate that messages from the source will include encapsulated data. Upon such determination, MMS 250 may de-encapsulate the user data message from the uplink NAS message. The de-encapsulated message may include the destination network address, and MMS 250 may then route the user data message to the destination (step 640) using conventional routing techniques (e.g., IP routing).

Referring now to the case of a "downlink" transmission being directed to machine UE device 211, in step 650 a user data message addressed to machine UE device 211 may be received by the MMS 250. In the context of the examples described above, the network address of machine UE device 211 may be routable for incoming traffic, for example, through visibility in a directory service, such as an HSS or a DNS system. For example, upon registration by the machine UE device 211, MMS 250 may advertise the availability of machine UE device 211 in a directory record associated with a device ID of the machine device 211 (e.g., its IMSI), and may further advertise the routability of the network address of the machine device 211 in routing services such that traffic directed to machine UE device 211 is routed to MMS 250.

Upon receipt of the downlink user data message addressed to machine UE device 211, MMS 250 may determine how to deliver the message to machine UE device 211 (step 660). In the context of the examples previously described, MMS 250 may consult the data structure storing associations between machine UE device 211 and serving eNodeB 231 to determine whether a special communications path exists for forwarding the message. If there are no associations stored in the data structure, the message may be discarded. Otherwise, the downlink user data message may then be sent to the serving eNodeB 231 using the special communications path (Step 670) and delivered to machine device 211 over the access network. In the context of previously described examples, the user data message may be encapsulated by MMS 250 in a downlink NAS message directed to machine UE device 211 and sent to serving eNodeB 231 over the S1-MME interface (e.g., utilizing the SCTP connection). Serving eNodeB 231 then forwards the downlink NAS message to machine device 211 using conventional NAS message forwarding processes.

In step 680, machine UE device 211 receives the message. In the context of the previously described examples, upon receipt of the downlink NAS message, machine device 211 determines that the NAS message contains encapsulated user data, then performs de-encapsulation of the message to produce the downlink user data message.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
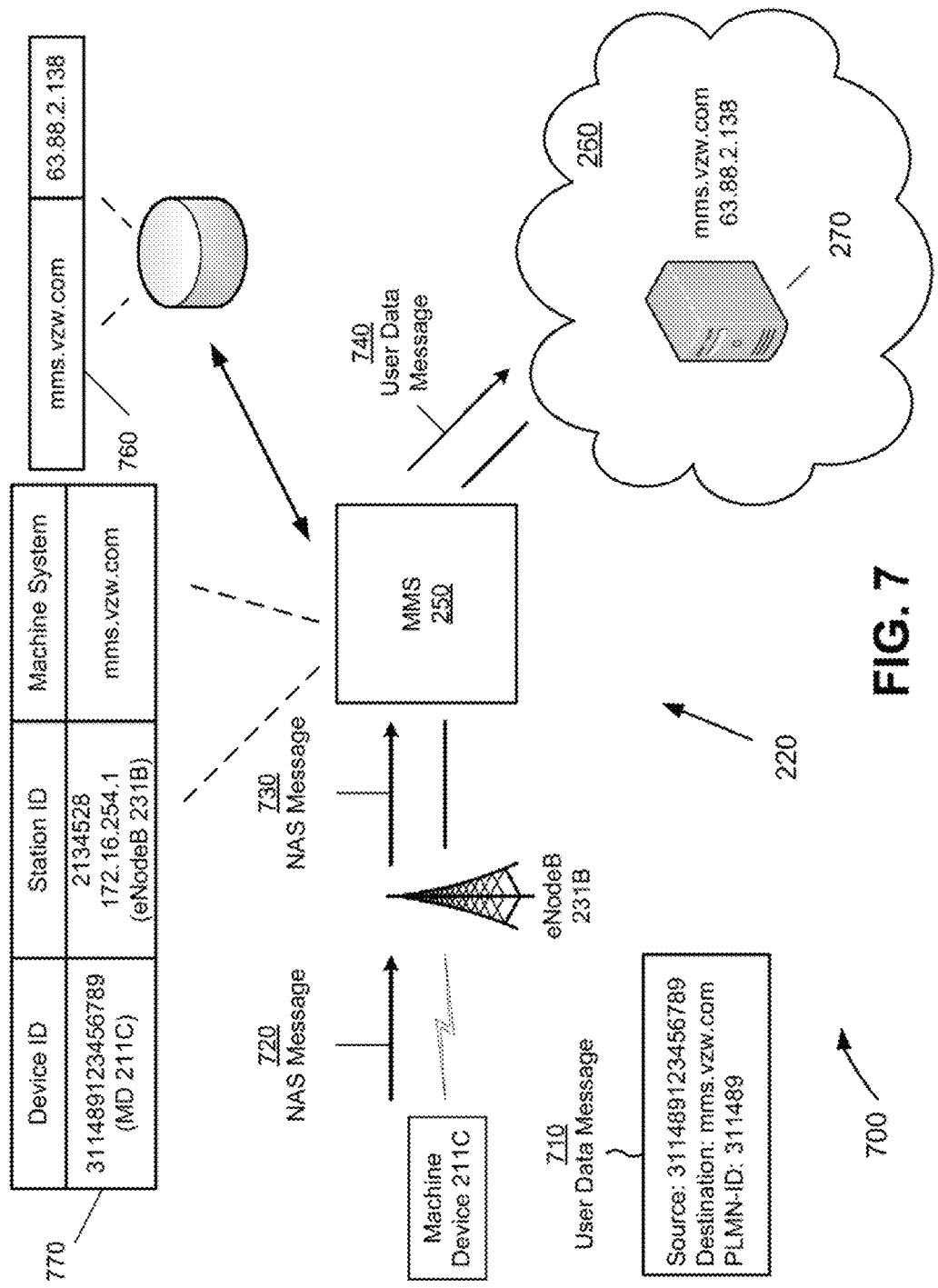
FIG. 7 is a diagram of an example implementation relating to the example process shown in FIG. 6.

FIG. 7 is a diagram of an example implementation 700 relating to example process 600 shown in FIG. 6. FIG. 7 illustrates an uplink scenario whereby machine UE device 211C may transmit a message to a destination system having a URL of "mms.vzw.com". As shown in FIG. 7, and by reference number 710, machine UE device 211C originates a user data message to be transmitted to destination "mms.vzw.com" according to the user data message protocol being employed by machine UE device 211C and destination system 260. Machine UE device 211C creates an uplink NAS message 720 that encapsulates the user data message, and transmits the uplink NAS message 720 over the access network to its serving eNodeB 231B, using the access network transport protocols (e.g., RRC). Access network protocols include a PLMN-ID ("311489") associated with machine UE device 211C. Serving eNodeB 231B receives NAS message 720 over the access network, and determines that it should be routed to MMS 250, for example, based on the PLMN-ID. eNodeB 231B then forwards it to MMS 250 as NAS message 730 using the S1-MME interface (e.g., utilizing the SCTP connection between eNodeB 231B and MMS 250). Upon receipt of the uplink NAS message, MMS 250 determines whether the NAS message is carrying encapsulated data (for example, by inspecting fields within the NAS message header, such as the protocol discriminator field) and if so, performs a de-encapsulation operation to retrieve the user data message.

MMS 250 further determines a routing decision for the user data message. The routing decision can be performed in various ways, and may be dependent on the format of the user data message protocol. In some embodiments, MMS 250 may consult a data structure storing associations for destination names and network addresses. For example, as shown in FIG. 7, MMS 250 consults a data structure 760 to determine a network address ("63.88.2.138") associated with destination name "mms.vzw.com." The user data message 740 is then routed to destination system 270 over the connection between MMS 250 and external elements 260. In some embodiments, MMS 250 may use the source device ID to determine the routing decision. For example, MMS 250 may identify the device ID within the uplink NAS message (e.g., the IMSI) and determine that the device ID is associated with destination system "mms.vzw.com." The determination may be by MMS 250 consulting data structure 770 to determine a destination system 270 associated with machine UE device 211C.

As indicated above, FIG. 7 is provided merely as an example. Other examples are possible and may differ from what was described with regard to FIG. 7.

Figure 8:
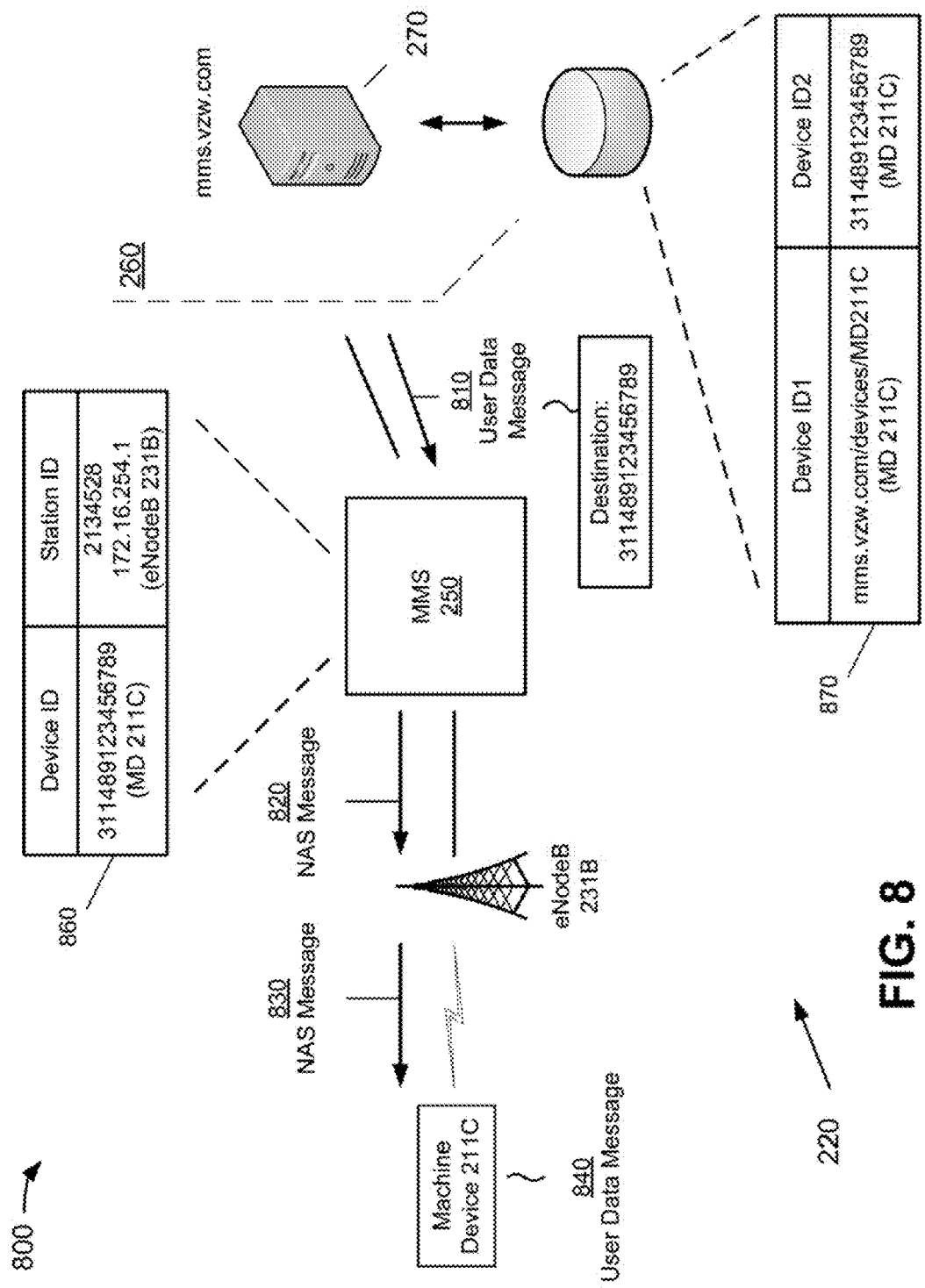
FIG. 8 is a diagram of another example implementation relating to the example process shown in FIG. 6.

FIG. 8 is a diagram of another example implementation 800 relating to example process 600 shown in FIG. 6. FIG. 8 illustrates a downlink scenario whereby a source system 270 having a URL of "mms.vzw.com" may transmit a user data message to machine UE device 211C. As shown in FIG. 8, and by reference number 810, source system 270 transmits a downlink user data message with a destination of machine UE device 211C. This destination may be expressed as a device ID of machine device 211C, which may have been obtained from a directory, service storing routing information associated with machine UE device 211C. For example, machine UE device 211C may be specified in source system 270 by a device name "mms.vzw.com/devices/MD211C," and destination information for downlink user data message to machine UE device 211C may be obtained by using the device name to query a directory service and obtain device ID "311489123456789" (illustrated by data structure 870). Information concerning the MMS 250 serving device 211C may also be obtained (from data structure 870 or another source).

Upon receipt of the downlink message directed towards machine UE device 211C at MMS 250, a determination is made how to dispose of the message. For example, MMS 250 may consult with data structure 860 to determine if the message should be transmitted to a registered machine UE device 211 using a special communications path. Information in the user data message, such as the network address of the machine UE device 211 or other device ID information may be used to determine in data structure 860 whether the machine UE device 211 is registered to receive transmissions through MMS 250 and the path through which to route the transmission. As shown in FIG. 8, an association record exists in data structure 860 and shows that eNodeB 231B is the serving station for machine UE device 211C. MMS 250 creates a downlink NAS message 820 directed towards machine UE device 211C and encapsulating the downlink user data message, which is then forwarded to eNodeB 231B via the S1-MME interface between MMS 250 and eNodeB 231B. eNodeB 231B receives the NAS message 820 and forwards as NAS message 830 over the access network to machine UE device 211C. Machine UE device 211C may then detect that the NAS message 830 encapsulates the downlink user data message (for example, by inspecting a header field of the NAS message), and de-encapsulate the NAS message to recover the user data message.

Figure 9:
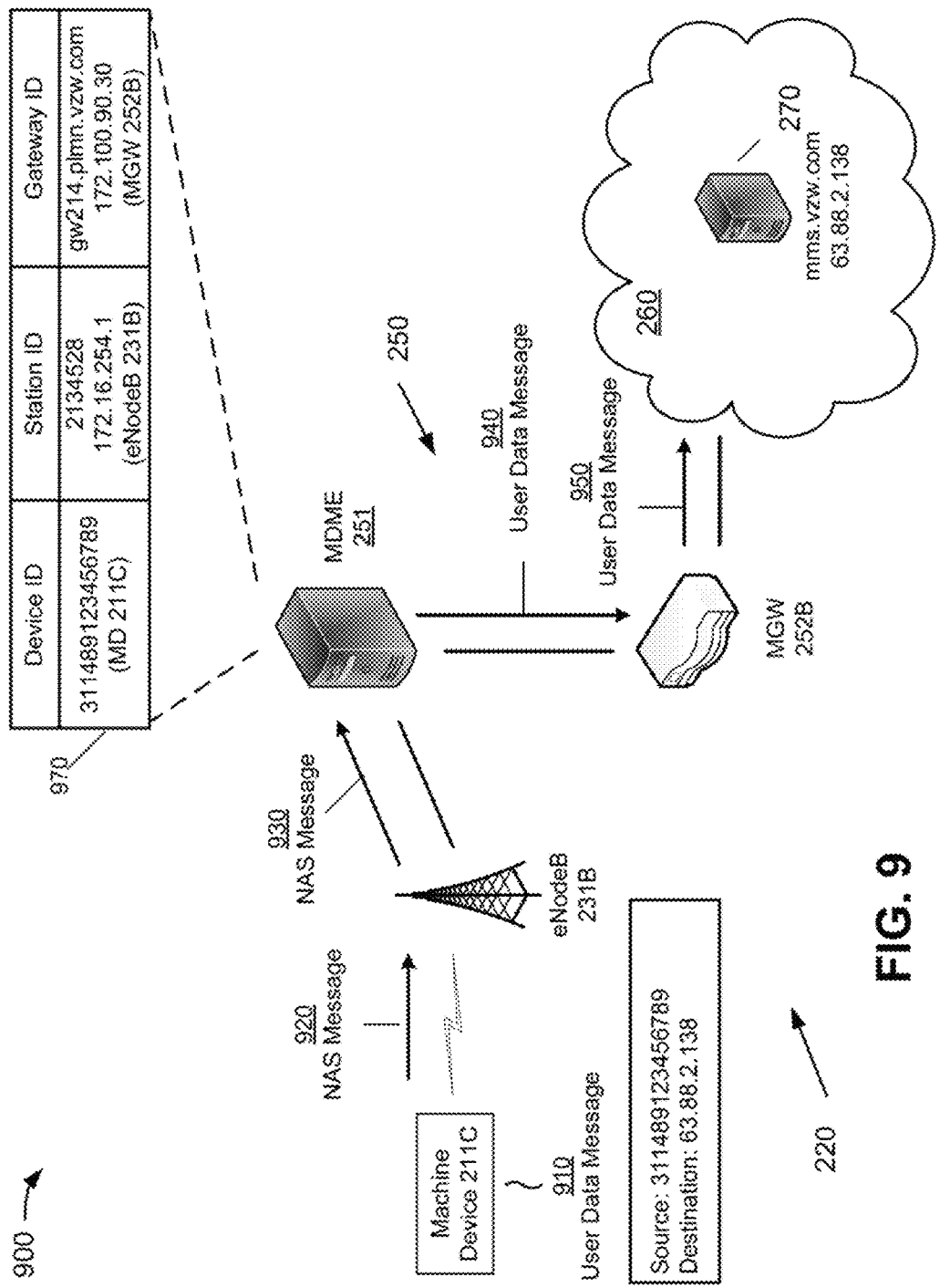
FIG. 9 is a diagram of another example implementation relating to the example process shown in FIG. 6.

FIG. 9 is a diagram of another example implementation 900 relating to example process 600 shown in FIG. 6. FIG. 9 illustrates an uplink scenario whereby machine UE device 211C may transmit a message to a destination having an IP network address of "63.88.2.138." In this configuration, MMS 250 is implemented using an MDME 251 and an MGW 252B, which has been assigned to serve as the machine gateway for machine UE device 211C. This assignment is reflected in the data structure 970, which may be stored in MDME 251 and/or MGW 252B.

As shown in FIG. 9, and by reference number 910, machine UE device 211C originates a user data message to be transmitted to destination IP address "63.88.2.138." Machine UE device 211C creates an uplink NAS message 920 that encapsulates the user data message, and transmits the uplink NAS message 920 over the access network to its serving eNodeB 231B. Serving eNodeB 231B receives NAS message 920 over the access network, determines that it should be routed to MDME 251, and forwards to MDME 251 as NAS message 930 using the S1-MME interface (e.g., utilizing the SCTP connection between eNodeB 231B and MDME 251). Upon receipt of the uplink NAS message, MDME determines whether the NAS message is carrying encapsulated data (for example, by indicators within the NAS message) and if so, performs a de-encapsulation operation to retrieve the user data message. MDME 251 further determines a routing decision for the user data message, for example, by consulting the data structure 970 storing associations for routing messages associated with machine UE device 211C. The routing decision may be performed in various ways, for example, by using the device ID of machine device 211C to determine the MGW 252 assigned to serve machine device 211C, or by using the station ID of eNodeB 231B to determine the MGW 252 assigned to serve traffic from that eNodeB 231. Other options could be used in other system configurations. In this example the MDME 251 determines the serving MGW 252 using the station ID of eNodeB 231B, and identifies MGW 252B as the gateway through which the message should be routed. The user data message is then routed to MGW 252B, as reflected by reference number 940, where it is further routed towards its ultimate destination of the system 270 associated with address "63.88.2.138."

As indicated above, FIG. 9 is provided merely as an example. Other examples are possible and may differ from what was described with regard to FIG. 9. For example, the MDME 251 may be configured to forward the uplink NAS message received from machine UE device 211 to MGW 252B, and MGW 252B may then perform the de-encapsulation to recover the user data message. In such a case, MDME 251 may initially determine whether the received NAS message contained encapsulated data, and if so, would determine to which MGW 252 the message should be forwarded (for example, using the data structure of associations described above).

Figure 10:
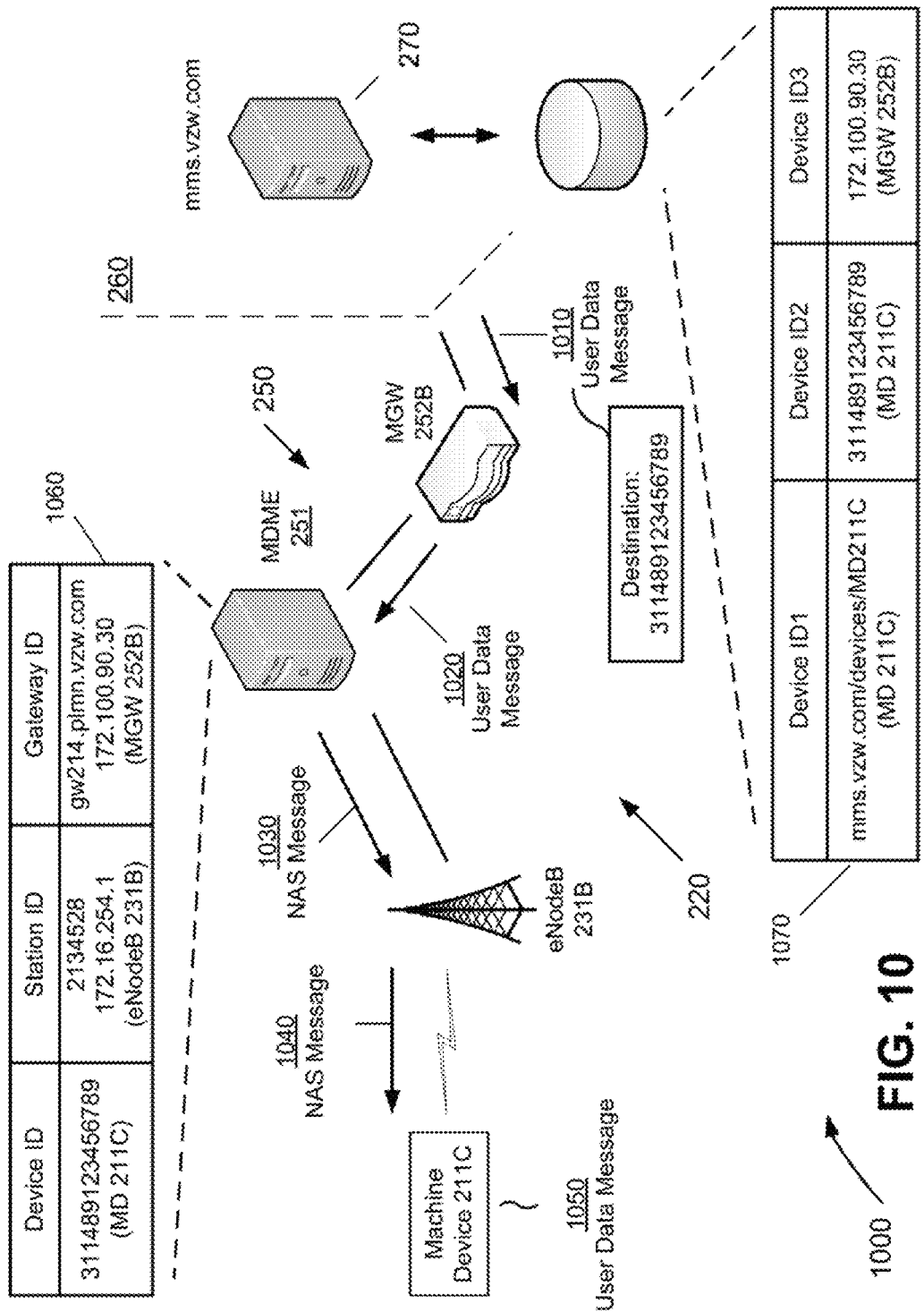
FIG. 10 is a diagram of another example implementation relating to the example process shown in FIG. 6.

FIG. 10 is a diagram of another example implementation 1000 relating to example process 600 shown in FIG. 6. FIG. 10 illustrates a downlink scenario whereby a source system 270 having an IP network address of "63.88.2.138" may transmit a message to machine UE device 211C. Similarly to FIG. 9, in this configuration, MMS 250 is implemented using an MDME 251 and an MGW 252B, which has been assigned to serve as the machine gateway for machine device 211C (as reflected in data structure 1060).

As shown in FIG. 10, and by reference number 1010, a source system 270 with an IP address of 63.88.2.138 transmits a downlink user data message with a destination of machine UE device 211C. This destination may be expressed as a device ID of machine device 211C, which may have been obtained from a directory service storing routing information associated with machine UE device 211C. For example, machine UE device 211C may be specified in source system 270 by a device name "mms.vzw.com/device/MD211C," and destination information for downlink user data message to machine UE device 211C may be obtained by using the device name to query a directory service and obtain device ID "311489123456789" (illustrated by data structure 1070). Addressing information for MGW 252B may also be obtained in order to route the user data message 1010 over the connection between external elements 260 and MGW 252B.

Upon receipt of the downlink message directed towards machine device 211C, MGW 252B performs a routing operation to forward the downlink user data message 1020 to MDME 251. The routing operation can take various forms. In one implementation, the routing operation is a conventional routing of traffic destined for machine device 211C to MDME 251 via a routing table maintained by MGW 252B (e.g., IP routing). Other implementations may include further determinations, such as database queries to determine the identity and/or network address of MDME 251 (for example, when multiple MDMEs 251 are used in MMS 250).

Upon receipt of the downlink message by MDME 251, a determination is made how to dispose of the message. For example, MDME 251 may consult with data structure 1060 to determine if the message should be transmitted to a registered machine UE device 211 using a special communications path. Information in the message, such as the network address of the machine UE device 211 or other device ID information may be used to determine in data structure 1060 whether the machine device 211 is registered to receive transmissions through MMS 250 and the path through which to route the transmission. As shown in FIG. 10, an association record exists in data structure 1060 and shows that eNodeB 231B is the serving station for machine UE device 211C. MDME 251 creates a downlink NAS message 1030 directed towards machine UE device 211C and encapsulating the downlink user data message, which is then forwarded to eNodeB 231B via the S1-MME interface between MDME 251 and eNodeB 231B. eNodeB 231B receives the NAS message 1030 and forwards as NAS message 1040 over the access network to machine UE device 211C. Machine UE device 211C may then de-encapsulate the NAS message to recover the user data message as noted previously.

As indicated above, FIG. 10 is provided merely as an example. Other examples are possible and may differ from what was described with regard to FIG. 10. For example, the MGW 252B may be configured to determine message disposal and perform NAS message encapsulation when it is determined that the incoming message traffic is directed towards a machine device that is registered (for example, using the data structure of associations described above). In such a case, the NAS message may be forwarded from the MGW 252B to the MDME 251 for delivery to the serving eNodeB 231B via the S1-MME interface.

Among the benefits of the examples described above, user data message traffic may be transmitted using the same interfaces and sessions established to provide control signaling, instead of having to establish separate user data bearer sessions through the network associated with each machine device. For example, referring to FIG. 7, user data bearer traffic directed to both machine device 211A and machine device 211B may be provided over the S1-MME interface between MMS 250 and eNodeB 231A using the existing SCTP session between these two elements. eNodeB 231A may use its existing processes to properly route NAS messages to the destination machine device. No bearers need to be established or maintained within network 220 in order to transit this user data traffic, as would be required in standard LTE access network/core network configurations.

Another benefit of the examples described above is the ability to provide specialized services to machine devices via MMS 250 without impacting the operation of the network for conventional devices. For example, MMS 250 may be configured to operate in conjunction with a machine system 270 deployed as an external element 260 in communication with MMS 250, where the machine system 270 provides facilities to manage and communicate with machine devices 211. In some embodiments, machine system 270 may provide an interface for accessing/storing data provided by machine devices (e.g., location information, sensor information, device status information, etc.) and specify profile information concerning machine devices (e.g., device names, data reporting schedules, etc.). In some embodiments, machine system 270 maintains device IDs for machine devices 211 managed by the machine system 270, and can communicate messages to machine devices 211 via MMS 250 using device IDs. For example, machine system 270 may maintain IMSIs for each machine device 211 under management, and user data messages sent from machine system 270 include the IMSI for the destination machine device 211 for the message. Likewise, MMS 250 may be configured to route messages from machine devices 211 to machine system 270 for processing.

As one example of the operation of machine system 270, a user may specify a change to the data reporting schedule for machine device 211C (e.g., from once per day to once per hour) using the interface provided by machine system 270. Machine system 270 may generate a user data message directed towards machine device 211C that indicates the specified change (according to the user data format being employed by machine system 270 and machine device 211C). The user data message may include a device ID of machine device 211C (e.g., its IMSI). Machine system 270 transmits the user data message to MMS 250, which delivers the user data message to machine UE device 211C (using the systems and methods described above). Machine device 211C may acknowledge the receipt of the user data message by generating a responsive user data message and sending to machine system 270 via MMS 250 (using the systems and methods described above).

As another example of the operation of machine system 270, a machine device 211 may generate a user data message containing sensor information (e.g., the machine device has made a measurement according to its rules for making such measurements, such as by time schedule or triggering threshold). Machine device 211 transmits the user data message to machine system 270 according to the systems and methods described above. The user data message is received at machine system 270, and determines which machine device 211 is sending the user message. This determination may be by device ID included in the user data message. Machine system 270 stores the sensor information in a data structure associated with machine device 211, such that the sensor information may retrieved in the future.

Another benefit that can be realized through the examples described above is the simplification of the networking facilities used by machine devices, which may be beneficial where machine devices have power and/or processing constraints. In some implementations it may not be necessary to use more complex networking protocols to communicate information with machine devices, as the user data is expected to be communicated between the machine device and the machine system 270, and a "lightweight" protocol can be used. For example, machine devices may avoid use of the commonly used well known IP stack, and simply use a specific protocol for communicating user data between the machine device and the machine system 270.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent any element is described herein as being in communication with or connected to any other element, such connection should be understood to include any connection that permits communication between such connected elements ("communicatively connected"), and such connection may include interposed elements to facilitate such communication.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising;
a user equipment (UE) device, comprising:
one or more processors to:
generate an uplink non-access stratum (NAS) message to be sent to an eNodeB over a radio access network (RAN),
the uplink NAS message encapsulating an uplink user data message and including:
a device identifier of the UE device, and
a header field indicating that the uplink NAS message contains the uplink user data message;
transmit the uplink NAS message to the eNodeB over the RAN,
the uplink NAS message being forwarded by the eNodeB, over a Mobility Management Entity (MME) interface, to a machine management system (MMS) based on the device identifier,
the uplink NAS message causing the MMS to:
determines that the uplink NAS message encapsulates the uplink user data message based on the header field,
perform de-encapsulation to retrieve the uplink user data message, and
forward the uplink user data message via a network interface to a network;
receive a downlink NAS message via the MMS,
the downlink NAS message comprising the device identifier and being from the network;
determine that the downlink NAS message contains encapsulated data; and
perform de-encapsulation of the downlink NAS message to produce a downlink user data message.

2. The system of claim 1, wherein the uplink NAS message includes lower level protocols containing the device identifier, and
wherein the uplink NAS message is forwarded by the eNodeB to the MMS based on the device identifier present in the lower level protocols.

3. The system of claim 2, wherein the device identifier is a Public Land Mobile Network ID (PLMN-ID) and
wherein the lower level protocols include a Radio Resource Control (RRC) protocol containing the PLMN-ID.

4. The system of claim 1, wherein the one or more processors, when determining that the downlink NAS message contains encapsulated data, are to:
determine that an indicator in a field of the downlink NAS message indicates that the downlink NAS message contains the encapsulated data.

5. The system of claim 1, wherein the one or more processors are further to:
determine that the UE device has entered a geographic area served by the eNodeB; and
wherein the one or more processors, when transmitting the uplink NAS message to the eNodeB over the RAN, are to:
transmit, based on determining that the UE device has entered the geographic area, the uplink NAS message to the eNodeB over the RAN.

6. A method, comprising:
receiving, by a machine management system (MMS) from an eNodeB over a first interface, an uplink non-access stratum (NAS) message,
the uplink NAS message including an uplink user data message encapsulated within the uplink NAS message,
the uplink user data message including a destination identifier associated with a destination;
determining, by the MMS, that the uplink NAS message contains the uplink user data message;
performing, by the MMS and based on the uplink NAS message containing the uplink user data message, de-encapsulation to obtain the uplink user data message;
forwarding, by the MMS, the uplink user data message over a second interface to a network for delivery to the destination;

receiving, by the MMS, a downlink message from the network through the second interface
the downlink message containing a device identifier of a user equipment (UE) device;
determining, by the MMS, whether the UE device is registered to receive messages and how to deliver messages;
encapsulating, by the MMS, the downlink message within a downlink NAS message; and
sending, by the MMS, the downlink NAS message to the eNodeB through the first interface for delivery to the UE device.

7. The method of claim 6, wherein determining that the uplink NAS message contains the uplink user data message includes:
determining by checking a field of the uplink NAS message for an indicator that the uplink NAS message contains the uplink user data message.

8. The method of claim 7, wherein the field of the uplink NAS message is a protocol discriminator field.

9. The method of claim 6, wherein the first interface is an S1-MME interface, and the second interface is a network interface.

10. The method of claim 6, further comprising:
receiving, from the eNodeB, a registration request of the UE device,
the registration request including one or more registration NAS messages and one or more device identifiers; and
registering the UE device.

11. The method of claim 6, further comprising:
comparing the device identifier to stored device identifiers that are associated with the MMS; and
determining that the device identifier indicates that the UE device is associated with the MMS based on comparing the device identifier to the stored device identifiers.

12. The method of claim 11, wherein the device identifier includes an International Mobile Subscriber Identity (IMSI), and
wherein determining that the device identifier indicates that the UE device is associated with the MMS includes:
determining whether a Public Land Mobile Network ID (PLMN-ID) portion of the IMSI has been previously designated as being associated with the MMS.

13. The method of claim 6, further comprising:
providing an indicator in a field of the downlink NAS message indicating that the downlink NAS message encapsulates the downlink message.

14. The method of claim 6, wherein determining whether the UE device is registered to receive messages includes:
checking for registration information associated with the UE device, and
wherein the method further comprises:
determining station information associated with the eNodeB based on checking for the registration information.

15. A system, comprising:
one or more processors, coupled to an S1-MME interface and a network interface, to:
receive an uplink non-access stratum (NAS) message from an eNodeB through the S1-MME interface;
the uplink NAS message including an uplink message encapsulated within the uplink NAS message,
the uplink message including a destination identifier associated with a destination;
de-encapsulate the uplink NAS message to retrieve the uplink message;
forward the uplink message over another interface to a network for delivery to the destination;
receive a downlink message from the network through the other interface,
the downlink message containing a device identifier of a user equipment (UE) device;
determine whether the UE device is registered to receive messages and how to deliver messages;
encapsulate the downlink message within a downlink NAS message; and
send the downlink NAS message to the eNodeB through the S1-MME interface for delivery to the UE device.

16. The system of claim 15, wherein the one or more processors are further to:
provide an indicator in a field of the downlink NAS message indicating that the downlink message is encapsulated in the downlink NAS message.

17. The system of claim 15, wherein the one or more processors, when determining whether the UE device is registered to receive messages, are to:
check for registration information associated with the UE device and
wherein the one or more processors are further to:
determine station information associated with the eNodeB based on checking for the registration information.

18. The system of claim 15, wherein the one or more processors are further to:
check a field of the uplink NAS message for an indicator that the uplink NAS message encapsulates the uplink message.

19. The system of claim 18, wherein the field of the uplink NAS message is a protocol discriminator field.

20. The system of claim 15, wherein the one or more processors, when determining how to deliver messages, are to:
determine whether a communications path exists for forwarding the downlink message by consulting a data structure storing associations between the UE device and the eNodeB.

* * * * *